Dec. 26, 1939. E. L. GROFF 2,184,298
ARTICULATED TRAIN
Filed Jan. 11, 1935 4 Sheets-Sheet 1
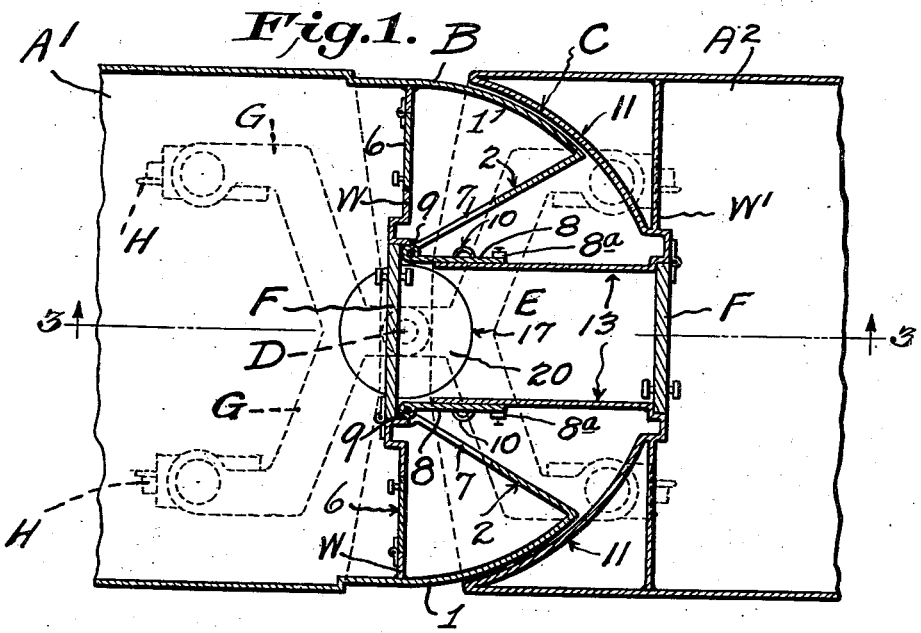
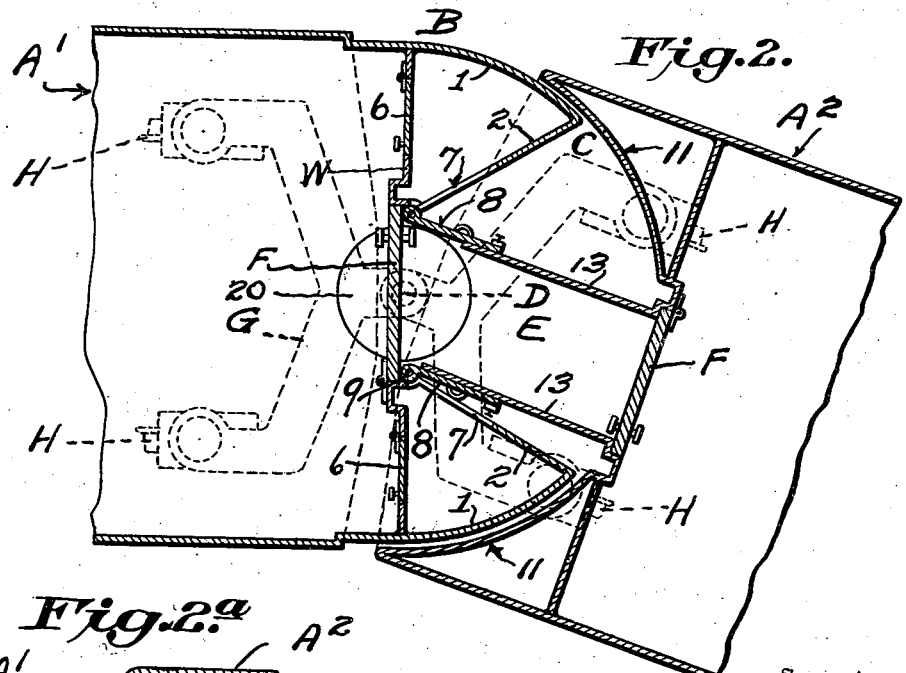
Inventor
Emory L. Groff Dec. 26, 1939.  E. L. GROFF  2,184,298
ARTICULATED TRAIN
Filed Jan. 11, 1935  4 Sheets-Sheet 2
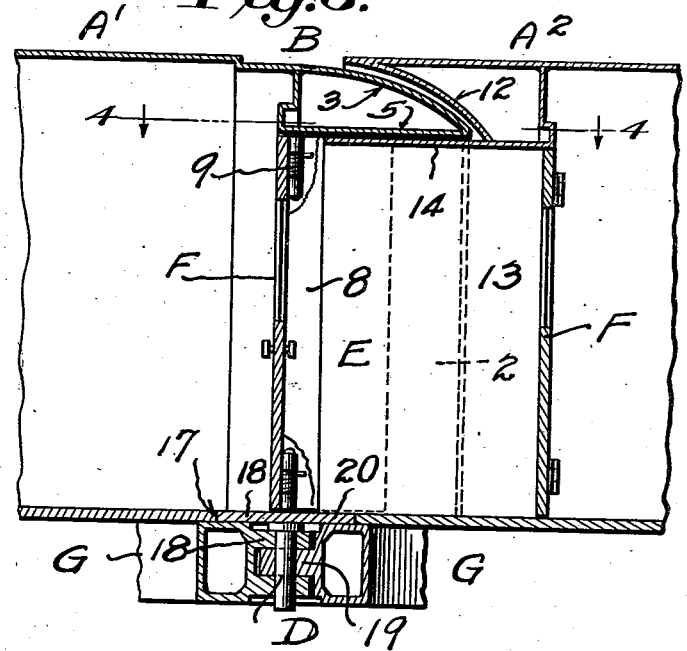
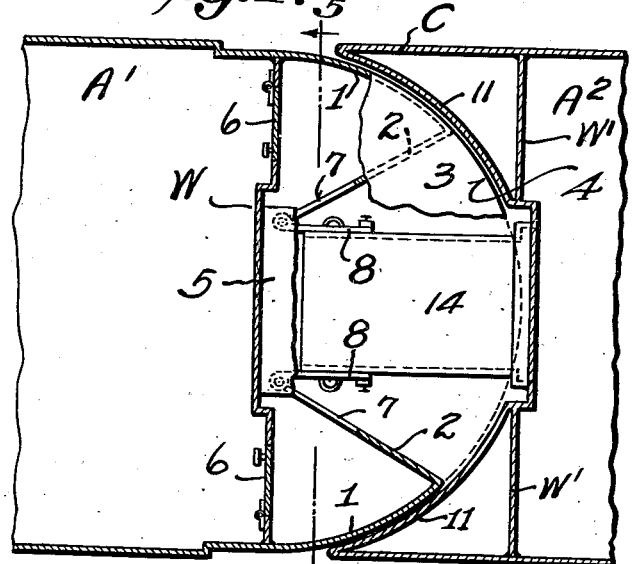
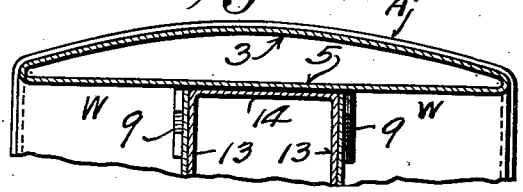

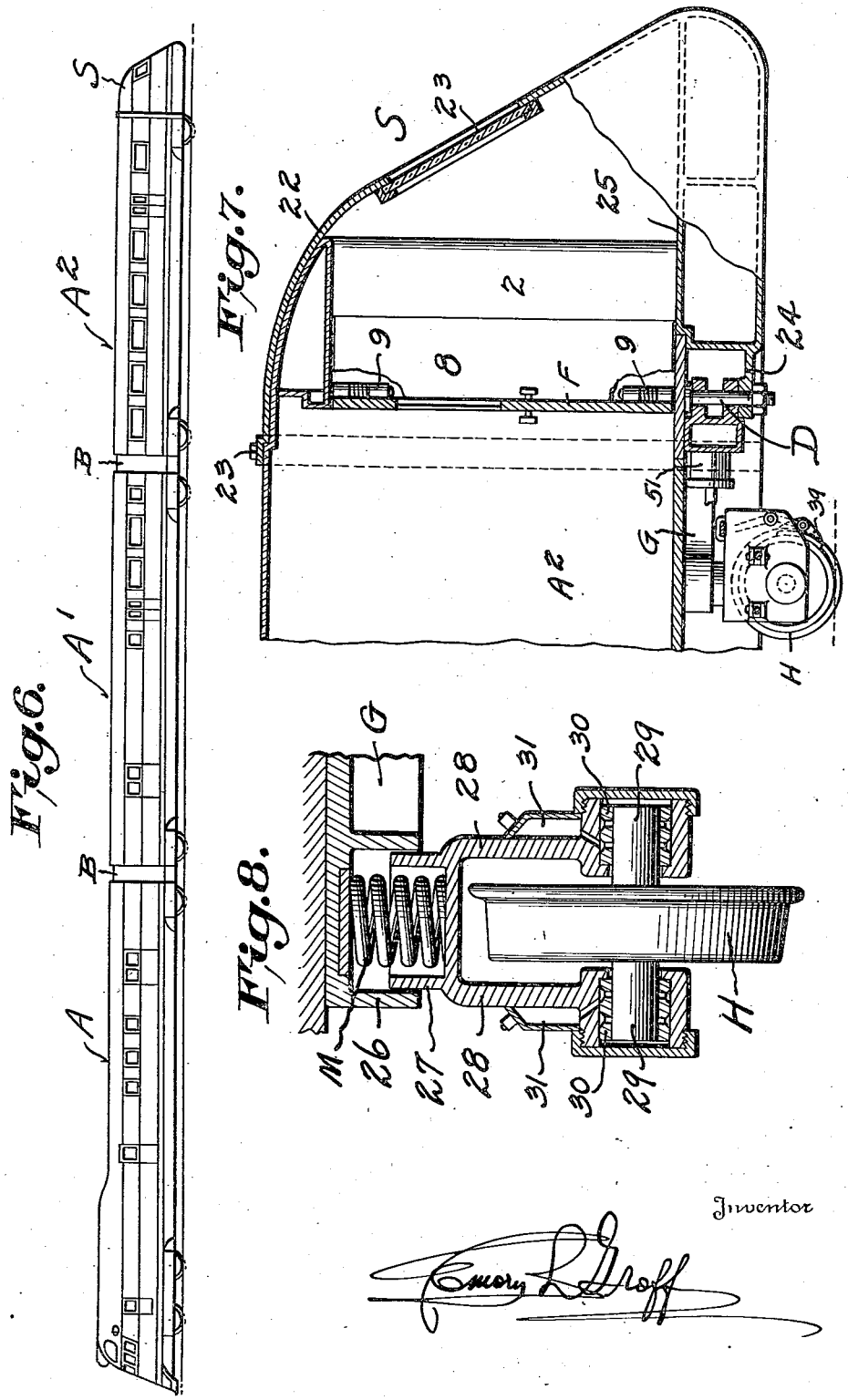

Dec. 26, 1939.  E. L. GROFF  2,184,298
ARTICULATED TRAIN
Filed Jan. 11, 1935  4 Sheets-Sheet 4

Inventor
Emory L. Groff

Patented Dec. 26, 1939

2,184,298

UNITED STATES PATENT OFFICE 2,184,298

ARTICULATED TRAIN

Emory L. Groff, Washington, D. C.

Application January 11, 1935, Serial No. 1,399

19 Claims. (Cl. 105—4)

This invention relates to articulated transportation units.

A primary object of the invention is to provide a transportation unit including a plurality of vehicle bodies having interconnected or interfitting vestibule ends and the adjacent vehicles being articulated for relative angular movement to enable the entire unit to readily adjust itself quickly to curves and other track conditions. In that connection, a distinctive feature of the invention resides in the novel formation of the interfitting or mating vestibule ends of the vehicle bodies which includes means providing a definite aisleway between the interconnected units to maintain communication between the vehicles under all conditions of use. That is to say, the invention contemplates a vehicle body construction wherein the vehicles have interfitting and substantially telescopically related end portions which form the vestibules between the vehicles while at the same time providing means for forming a definite aisleway which is entirely shielded or protected by the exterior portions of the vehicle bodies.

Another object of the invention is to provide a transportation unit wherein the number of vehicles may be increased as desired without the necessity of compelling the unit being built in the first instance with a predetermined number of vehicles. In other words, the present invention contemplates an individual car construction which will permit of adding articulated vehicles, as desired, and then effectively and adequately closing an end of the unit by an end member or shell or other closure element.

A further object of the invention is to provide a transportation unit comprising articulated vehicles which are supported on individually sprung wheels whereby road inequalities such as occasioned by low joints and the like will not be transmitted to the vehicles themselves, while at the same time, the individually sprung wheels will be free more readily to follow track curves and, therefore, be safer at high speeds or curves. As a part of this object, the invention contemplates as an additional feature, pivotally mounting the individually sprung wheels so that relative movement will be readily possible to accommodate the vehicles to track conditions, while at the same time, yieldingly connecting opposite wheels by means which will prevent shaking of the wheels on their individual pivots in the event that one wheel temporarily meets an obstruction that will have a tendency to set up undue oscillation. It is also within the scope of this object to provide braking means for the individual wheels, thereby permitting of effectually controling the entire unit in stopping and starting.

With the above and other objects in view which will more readily appear as the nature of the invention is better understood, the same consists in the novel features of construction, combination and arrangement of parts as will be hereinafter more fully described, illustrated in the accompanying drawings and defined in the appended claims.

A preferred and practical embodiment of the invention is shown in the accompanying drawings, in which:

Figure 1 is a horizontal sectional view of a pair of adjacent connected vehicles of the transportation unit, said vehicles being in longitudinal alignment.

Figure 2 is a sectional view similar to Figure 1 showing the relative position of parts when the adjacent interconnected vehicles are angularly disposed.

Figure 2ª is a detail sectional view illustrating the manner of weatherproofing the telescoping parts of adjacent vehicle ends.

Figure 3 is a vertical sectional view taken on the line 3—3 of Figure 1.

Figure 4 is a horizontal sectional view taken on the line 4—4 of Figure 3.

Figure 5 is a detail vertical sectional view taken on the line 5—5 of Figure 4.

Figure 6 is a side elevation view of a transportation unit embodying the present improvements.

Figure 7 is a detail view illustrating the detachable shell for an end vehicle comprising the transportation unit.

Figure 8 is a vertical sectional view of one of the individually sprung pivoted supporting wheels.

Figure 9:
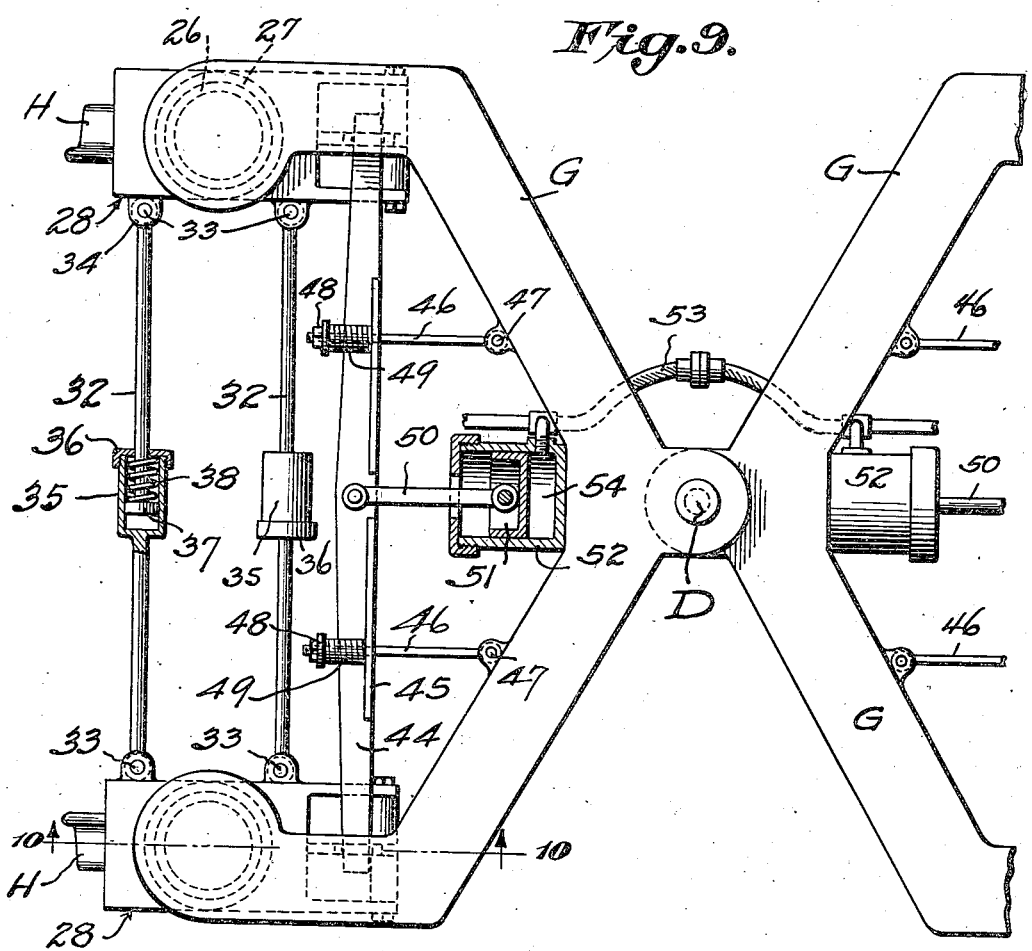

Figure 9 is a plan view, partly in section, of the articulated truck for supporting and connecting adjacent vehicle bodies.

Figure 10:
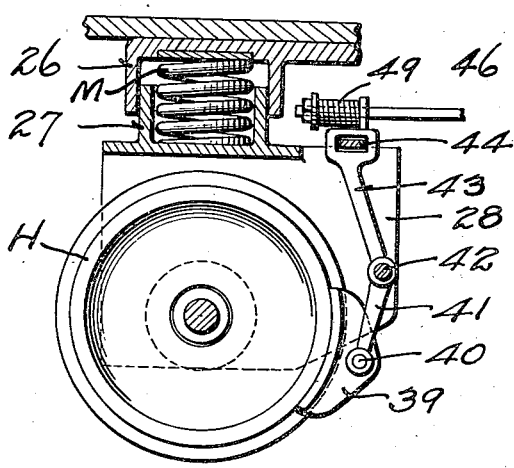

Figure 10 is a detail vertical sectional view taken on the line 10—10 of Figure 9.

Similar reference characters designate corresponding parts throughout the several figures of the drawings.

According to the present invention, it is desired to eliminate vestibule sections of the cylinder type for establishing communication between adjacent vehicles and to provide vehicle bodies having interconnected ends having a definite aisleway or passage which will readily adapt itself to all angular positions of the connected bodies and which is not dependent on the pivot or axis of articulation for its adjusting movement. Also, the invention is intended to provide a transportation unit which is not limited as to the number of vehicles constituting the same and which will permit of the individual units having their own wheels so that they may be readily shifted or interchanged as desired to provide a transportation unit consisting of any desired number of different type vehicles such as coaches, Pullmans, diners, express, mail, or other cars. Heretofore, it has been the general practice to construct transportation units so that they are initially made up of a predetermined number of vehicles before being placed in service, and should it be desired to change any of the vehicles of the unit, considerable dismantling and shop service is required to effect the change. Moreover, according to this practice, if one of the vehicle units become damaged, it means that the entire transportation unit is laid up while repairs can be effected. On the other hand, the present invention contemplates a transportation unit including a plurality of self-contained and self-sustaining vehicle units which may be connected and disconnected according to the requirements of a particular transportation unit make up, while at the same time adequately providing for communication between the units and also providing a suitable end closure or shell for an unmated end of one of the vehicles. Although this shell ordinarily constitutes an observation housing which may be made to conform to the streamline characteristics of a train where the design of the entire transportation unit is intended to meet the requirements of the streamline train, nevertheless it may be used at either end of the unit. That is to say, while the present invention provides means for relative interchange of articulated units and the closing of an end of one of the units as above indicated, nevertheless, it will be obvious that it is within the scope of the invention to provide a shell or closure for both ends of the unit in the event that any one of the vehicles is provided with means of locomotion which will permit the vehicle to run in either direction, as for example, when the locomotive is electrically driven.

According to the embodiment of the invention shown in the accompanying drawings, it is proposed to provide an articulated train consisting of a plurality of vehicle units A, A', A², etc. One of these units may be provided with suitable power means for propelling the train.

Referring first to the individual units A' and A², for example, it will be observed from Figure 1 which shows the ends of adjacent articulated vehicles, that a novel vestibule arrangement is provided. That is to say, the unit or vehicle A' may be provided with a relatively rounded vestibule portion B which telescopically interfits with the relatively open or pocket-like end C of an adjacent unit. The mating parts B and C are generally formed on a radius which coincides with the axis of articulation D between the vehicle units A' and A². The respective mating ends B and C of the vehicle units are provided with aisleway forming means designated generally as E for the purpose of establishing communication between the vehicles in all relative angular positions, and, if desired, the portion of the aisleway opening into each vehicle may be rendered accessible through a door F.

It will, of course, be understood that each vehicle unit is provided at one end with a rounded portion B while its other end is formed with a receiving or pocket portion C. That is to say, the end of one vehicle is always intended to telescopically mate with the adjacent end of an adjoining vehicle so as to form the aisleway E previously referred to.

Referring more specifically to the rounded vestibule forming portion B, it will be observed that the same preferably includes the arcuate wall portions 1 which are connected with the oblique wall portions 2 which are divergently related with respect to each other to provide ample clearance when one vehicle turns with reference to another as will presently appear. The vertical walls 1 and 2 are surmounted by a curved top 3 (Figure 3) whose outer edge 4 conforms to the arc of a circle whose radius has its center coincident with the axis of articulation. The top 3 also includes a bottom wall 5 extending (Figure 3) between the obliquely disposed vertical walls 2—2 so as to completely house and shield the space therebetween. The vehicle unit A' is provided with an interior end sheet or partition wall W which may be rabbeted or otherwise formed to receive the door F, and may also be provided with the doors 6—6 which permit of access to the space formed between the partition W and the walls 1 and 2 previously referred to. The walls 2—2 may be cut away as at 7 to receive a pair of pivoted wings 8—8 when it is desired to bring the wings into alignment with the walls 2. These wings are pivoted as indicated at 9 by means of spring hinges which normally tend to urge the wings inwardly toward each other. If it is desired to bring the wings back into line with the walls 2, that is within the openings 7, the same may be held in this position by the latch means 8ª. For the purpose of manipulating the wings 8, the same may be provided with a handle 10 or its equivalent which is accessible through the door 6 and opening 7. The arrangement described permits of keeping the wings 8—8 in proper position when the vehicles or cars are uncoupled.

The receiving or pocket end C of the vehicle A² is formed with a pair of inwardly curved walls 11—11 which are formed on a radius whose axis is coincident with the axis of articulation D. These walls extend vertically to embrace and overlap the walls 1 and as will also be observed from Figure 3, the pocket C is further provided with a top wall 12 which overlies the top wall 3 of the rounded vestibule portion D. Further, the vehicle A² is provided with an end sheet or partition wall W' which may be formed to receive a door F, as indicated, and also has associated therewith a relatively stationary or fixed aisle or passage forming member which consists of the side walls 13—13 and top wall 14. The top wall 14 underlies the wall 5 previously referred to and the side walls 13 project toward the end of the vehicle A² so as to be engaged at their outer sides by the spring tensioned wings 8 when the cars are coupled as shown in Figures 1 to 4. It will, of course, be apparent that the wings 8—8 are co-extensive in vertical height with the side walls 13—13 of the passageway forming member.

With the arrangement above described, it will be apparent that the adjacent or adjoining ends of vehicle units are telescopically interfitted so that relative angular movement between the vehicles on the pivot or axis of articulation D is possible. As one vehicle unit changes its angular relation to the other, the spring pressed wings 8—8 will always engage the sides 13—13 of the aisle forming member while the walls 13—13 retain their parallel relation and provide a definite aisleway of given width for establishing communication between the vehicles. Due to the oblique position of the walls 2—2, it will be apparent that ample clearance is provided to permit of the desired relative angular movement of the walls 13—13 with reference to the adjacent connected vehicle.

When the adjacent vehicles are disconnected or uncoupled, it will be understood that the aisleway 13—14 remains rigidly as a part of the car $A^2$ and the wings 8—8 remain as a part of the adjoining car, and, in order that they may be held in an out of the way position, temporarily, they may be drawn back into the openings 7 and latched until a mating vehicle is brought into coupling relation. The wings 8—8 will always form an effective seal for the inner ends of the walls 13. In view of the overlapping of walls 5 and 14 and also the overlapping of walls 1 and 11, and likewise walls 3 and 12, it will be apparent that the connection between adjacent vehicles is adequately housed and protected from the weather, and to further provide a weatherproof joint, between the vehicles, it is proposed to use the arrangement shown in Figure 2ª. As will be observed from this figure, the opposite walls 1 and 11 may be bridged by a weatherstrip element 15. This element is preferably a spring bronze strip having one edge secured to one of the walls as indicated at 16 while its free edge yieldingly bears against the opposite wall.

As previously indicated, one of the distinctive features of the present invention is to provide each vehicle unit with supporting wheels so that it may be readily shifted on the track with respect to another vehicle unit. To that end, each vehicle is provided with suitable wheels which are preferably of the individually sprung type and which may be associated with an articulated coupling frame one-half of which is carried by the adjacent end of each car.

Referring to Figures 1 and 2 for example, it may be pointed out that the pivotally connected truck frames are indicated generally at G while the wheels are indicated generally at H. The frames G—G are connected by the pivot pin D which constitutes the axis of articulation between the vehicles. As will be observed from Figures 1, 2 and 3, the floor of the cars or vehicles may be provided with an opening 17 which permits of access to the coupling portions 18 and 19 of the truck frames which receive the coupling pin D. This opening 17 is preferably closed by a cover 20 which lies flush with the floor of the vehicle A' and the floor of the aisleway or passage provided between the walls 13—13. By removing the coupling pin D, it will be apparent that the cars may be readily uncoupled or separated and when so separated, they may be shifted or interchanged and then recoupled as shown in Figures 1-4 inclusive to effectively close the gap between adjacent cars and provide a transportation unit of substantially unbroken exterior continuity as shown in Figure 6.

Figure 7 of the drawings illustrates an end shell or closure member S which may be fitted to one of the unmated ends of one of the vehicles. In the example shown, the shell S is fitted to the unmated rounded end of the trailing or last vehicle of the unit. This shell may consist of an outer wall 22 which may be provided with a window 23 and when fitted to the rounded end of a vehicle may form an observation compartment while at the same time providing the proper streamline characteristics for the end of the transportation unit. This shell may be secured to the upper portion of the unmated vehicle end by suitable fastenings 23 and may also be provided with a bottom coupling portion 24 which may be engaged by one of the coupling pins D. By removing the fastenings 23 and coupling pin D (Figure 7) the shell S may be readily detached. The shell may be readily handled on a small flat car and permits of closing a trailing end of a transportation unit in an effective and efficient manner. As shown in Figure 7, the wings 8 are brought back into line with the walls 2 and the floor 25 of the shell lies flush with the floor of the vehicle. Thus, the space between the walls 2—2 enclosed by the wall 22 of the shell may provide an end compartment which may be utilized for various purposes.

Figures 8, 9 and 10 of the drawings further illustrate the truck units. The truck frames G—G may be provided with spring sockets 26 for receiving the pivot collars 27 of a wheel supporting casting 28. A comparatively heavy spring M is confined in the socket formed by the telescoping parts 26 and 27 and the wheel H is suitably journalled in the side walls 28. In the example shown, the axle portions 29 of the wheel H may be mounted in perforated bushings 30 which receive a supply of grease or non-fluid oil from the lubricating pockets 31. It will be apparent that with the arrangement described, the wheels H have a swivel connection with the truck frame. To avoid undue oscillation of the individually sprung and swivel wheels, each opposite wheel support is yieldingly connected with the other. As will be observed from Figure 9, drag links 32 have their opposite ends pivotally connected as at 33 to pivot brackets 34 formed on the inner side walls 28. These drag links preferably include a medial spring connection 35. In the assembly shown, this connection consists of a cylinder open at one end which is adapted to be closed by a cover 36. The cylinder receives the head 37 of one of the drag links and operates against a compressed spring 38 confined between the head and the cover 36 of the cylinder. Thus, the drag links 32—32 are tensioned so that one wheel may yield with reference to the other but any tendency to set up undue oscillation is resisted by the arrangement of drag links shown.

For the purpose of braking the individual swivel wheels H, any suitable form of braking means may be employed. For example, each wheel may be equipped with a brake shoe 39 pivotally carried as at 40 by the lower arm 41 of a brake lever pivotally mounted as at 42 between the walls 28—28. The upper arm 43 of the lever is preferably interlocked with a transverse brake beam 44. This beam may have an upstanding flange portion 45 provided with suitable openings for receiving the rods 46. These rods are pivoted at one end as indicated at 47 to the frame G and are equipped at their opposite ends with nut and washer means 48 for compressing a spring 49 against flange 45. Normally, the springs act to apply the brake shoes 39 to the treads of the wheels H. For the purpose of counteracting the force of the springs 49 to release the brake shoes 39 from engaging with the wheels, the beam 44 may be connected with a rod 50 which is pivotally connected with a piston 51 operating in an air cylinder 52. This cylinder is connected with the air supply line 53 so that when air pressure is applied to the chamber 54, the piston will be moved backwardly toward the transverse center of the car or vehicle and thus push the brake beam 54 backwardly to counteract the force of the springs 49 and also release the brake shoes 39.

From the foregoing it will be apparent that the truck frames G—G at the ends of each car may be disconnected by removing the coupling pin D and the air hose 53 may be disconnected in the customary manner so as to permit the cars to be uncoupled or separated for movement on their own wheels to effect shifting or interchange of cars making up the transportation unit.

When the cars are coupled for service, they will be supported by individually sprung and relatively swivelled wheels which will permit of the trucks readily adjusting or adapting themselves to track inequalities and curves, thus not only increasing the factor of safety in taking curves at high speeds, but at the same time providing each car with individual wheel supports which in the event of accidental uncoupling will permit the individual cars to remain on the rails.

With regard to the vestibule forming means between the units, it will be apparent that a passenger is not exposed to any danger due to the relative change in angular position of the cars in event that he is in the aisleway when the cars take a curve. Moreover, the particular form of vestibule means provides a tight closure between adjacent vehicles and the space between the end or partition walls in the vehicle and the mating parts B and C may be used as storage compartments, thereby not sacrificing any material space in the transportation unit.

Without further description it is thought that the features and advantages of the invention will be readily apparent to those skilled in the art, and it will of course be understood, that changes in the form, proportion and minor details of construction may be resorted to, without departing from the spirit of the invention and scope of the appended claims.

I claim:

1. An articulated transportation unit comprising adjacent vehicle bodies articulated on a common axis, one of said bodies being formed with a pocket extending in the zone of the roof and the sides of the body and the other of said vehicle bodies being provided with an extension formed to fit into said pocket of the first mentioned vehicle said pocket and extension being formed on arcs whose axes are located in the center of articulation, a rigid interior aisleway forming member carried by the vehicle having the pocket and located within said pocket, and pivoted wing members carried by the vehicle body having said extension, said wing members being adapted for adjustable engagement with the aisleway forming member.

2. A transportation unit comprising a pair of adjacent vehicle bodies articulated on a common axis, one of said bodies being formed with a recessed portion having transversely arcuate side walls whose radius lies in the center of articulation and an arched top portion, an aisleway forming member comprising a top and side walls projecting into said recess, the other body having an extension provided with arcuate side walls also formed on a radius whose arc lies in the center of articulation and an arched top wall for fitting into the mating portion of the recessed portion of the first mentioned body, a pair of vertically hinged wing members mounted in the body of the vehicle having the extension, said wing members being adapted to slidably engage the sides of the said aisleway forming member.

3. A transportation unit comprising a pair of adjacent articulated vehicle bodies, the end of one of said bodies being formed with a recess and having an aisleway forming member disposed therein, the other of said bodies having an extension formed to mate with said recessed portion of the first mentioned body, said recess and extension being formed on mating arcs whose axes are located in the center of articulation, and pivoted wing members carried by the vehicle body having said extension, said wing members adapted for engagement with the aisleway forming member.

4. In a transportation unit, a pair of vehicle bodies articulated on a common axis and the ends of each body having telescopically interfitting portions formed on arcs whose axes lie in the center of articulation, and means comprising one rigid member and one adjustable member respectively carried by the adjacent mating ends of the vehicles for providing an aisleway to establish communication between the vehicle bodies in all relative angular positions thereof.

5. In a transportation unit, a pair of vehicle bodies articulated on a common axis and said bodies having telescopically interfitting end walls formed on arcs whose axes lie in the center of articulation, means comprising one rigid member and one adjustable member respectively carried by the mating ends of said bodies to provide a continuous aisleway of uniform width to establish communication between the vehicle bodies in all relative angular positions thereof.

6. In a transportation unit, a pair of vehicle bodies articulated on a common axis and the ends of each body adapted to interfit with the ends of adjacent bodies and means providing an aisleway for establishing communication between said pair of bodies, said means comprising a rigid passageway forming member carried by one of the bodies, and means mounted on vertical pivots located on a transverse line intersecting the axis of articulation and carried by the other of said vehicle bodies for telescopically engaging the rigid member of the other vehicle to provide an aisleway between adjacent vehicles in all relative angular positions thereof.

7. A transportation unit comprising a pair of vehicle bodies articulated on a common axis, one of said vehicle bodies having an open end for telescopically receiving a relatively closed end of an adjacent vehicle body said open and closed ends including mating walls formed on arcs whose axes lie in the center of articulation, a substantially rigid aisleway forming member carried by the vehicle body having the relatively open end, and a plurality of wing-like vertically pivoted members carried by the vehicle body having the relatively closed end for adjustably engaging with said relatively rigid aisleway forming member to provide a closed aisleway establishing communication by the vehicle bodies in all relative angular positions thereof.

8. A transportation vehicle for articulated trains including a body having a rounded vestibule section at one end thereof and formed on an arc whose axis lies in the center of articulation at one end of the body, and the opposite end of the body being provided with a pocket including a wall formed on an arc to mate with the rounded end of an adjacent vehicle body, an opening in the body defining a doorway at the rounded end of the body, movable members mounted adjacent said doorway and having vertical supporting axes located in a transverse line intersecting the center of articulation, and a relatively rigid aisleway forming member carried by the end of the vehicle having the pocket.

9. A transportation unit having a pair of vehicle bodies articulated on a common center, telescoping means at the adjacent ends of the bodies formed on mating arcs whose axes lie in the center of articulation, and means within said telescoping means forming a substantially rigid aisleway between said bodies.

10. A transportation unit having a pair of vehicle bodies articulated on a common center, telescoping means at the adjacent ends of the bodies formed on mating arcs whose axes lie in the center of articulation, and means within said telescoping means forming an aisleway between said bodies, said last named means including slidably related members carried by each one of said pair of vehicle bodies.

11. A transportation unit comprising a pair of vehicle bodies articulated on a common center, each body having interfitting mating exterior end portions formed on mating arcs whose axes lie in the center of articulation, and spaced wall elements communicating with rigid doorways in each one of said bodies to form a continuous aisleway between said bodies in all relative angular positions thereof.

12. Telescopically interfitting articulated car bodies respectively having the end wall of one body curved outwardly on an arc whose axis lies in the center of articulation between the bodies and having the adjacent end of the other body curved inwardly on an arc whose axis also lies in the center of articulation, an aisleway forming member carried by the last mentioned body, and wing members pivoted vertically on the first mentioned body on a transverse line passing through the center of articulation, said wing members having a slidable engagement with the aisleway forming member.

13. Telescopically interfitting articulated car bodies respectively having the end wall of one body curved outwardly on an arc whose axis lies in the center of articulation between the bodies and having the adjacent end of the other body curved inwardly on an arc whose axis also lies in the center of articulation, a rigid aisleway forming member carried by the last mentioned body, and spring biased wing members pivoted vertically on the first mentioned body on a transverse line passing through the center of articulation said wing members having a slidable engagement with the aisleway forming member.

14. Telescopically interfitting car bodies respectively having the end wall of one body curved outwardly on an arc whose axis lies in the center of articulation between the bodies and having the adjacent end of the other body curved inwardly on an arc whose axis also lies in the center of articulation, an aisleway forming member carried by the last mentioned body, wing members pivoted vertically on the first mentioned body on a transverse line passing through the center of articulation, said wing members adapted to have a slidable engagement with the aisleway forming member, and wall members located within the said outwardly curved end wall of the first mentioned body and disposed in a plane intersecting the pivots for the wings.

15. Telescopically interfitting car bodies respectively having the end wall of one body curved outwardly on an arc whose axis lies in the center of articulation between the bodies and having the adjacent end of the other body curved inwardly on an arc whose axis also lies in the center of articulation, an aisleway forming member carried by the last mentioned body, wing members pivoted vertically on the first mentioned body on a transverse line passing through the center of articulation, said wing members adapted to have a slidable engagement with the aisleway forming member, and wall members located within the said outwardly curved end wall of the first mentioned body and disposed in a plane intersecting the pivots for the wings, said wall members having openings to receive the said wings when the latter are moved into the plane thereof.

16. A transportation unit including a plurality of vehicle bodies mounted on articulated truck sections including a center bearing for connecting the bodies, each body having an arcuate end portion for telescopically interfitting with a mating arcuate end portion of an adjacent body, a vestibule shell for closing the unmated end of one of the bodies of the unit, and means for detachably connecting the shell to the center bearing of the truck section at said unmated end.

17. A transportation unit comprising a plurality of articulated vehicle bodies mounted on truck sections including a center bearing for pivotally connecting the bodies, each body having an end portion for telescopically mating with an adjacent body, said telescopically mating portions being formed on arcs whose axes lie in the center of articulation, means providing an aisleway between the telescopically mated bodies, and vestibule closure means detachably connected to the center bearing at the unmated end of one of the bodies to provide a closure for the said aisleway and permitting relative change in position of the vehicle bodies making up the unit.

18. An articulated vehicle body mounted on trucks including center bearings for connecting the body with adjacent bodies, said body having an end wall curved inwardly on an arc whose axis lies in the center of articulation for that end of the body and also having a longitudinally disposed aisleway forming member, an outwardly curved end wall at the opposite end of the body, the curve of said last named wall also being on an arc whose axis is coincident with the center of articulation at that end of the body, wing members, pivots spaced on the opposite sides of the longitudinal center of the body and connecting said wings to the body on a transverse line passing through the center of articulation located at the end of the body having the outwardly curved end wall, vertical walls provided with openings and extending radially from said pivots, said openings being adapted to receive the wings, and an end shell detachably fitted to the truck center bearing of the outwardly rounded end wall of the body to form an observation vestibule when the said wings are placed in said openings.

19. An articulated transportation unit including adjacent bodies having mating telescopically interfitting end sections formed on mating arcs whose axes lie in the center of articulation between the bodies whereby the interfitting telescoping relation of the end sections may be maintained while the bodies are in longitudinal alinement or in relative angular relation, and means comprising rigid and adjustable parts forming an aisleway between said bodies housed within said interfitting end sections, said parts being carried by the ends of the adjacent bodies.

EMORY L. GROFF.